J. OLIVER.
Preserving and Drying Lumber.
No. 142,347. Patented September 2, 1873.
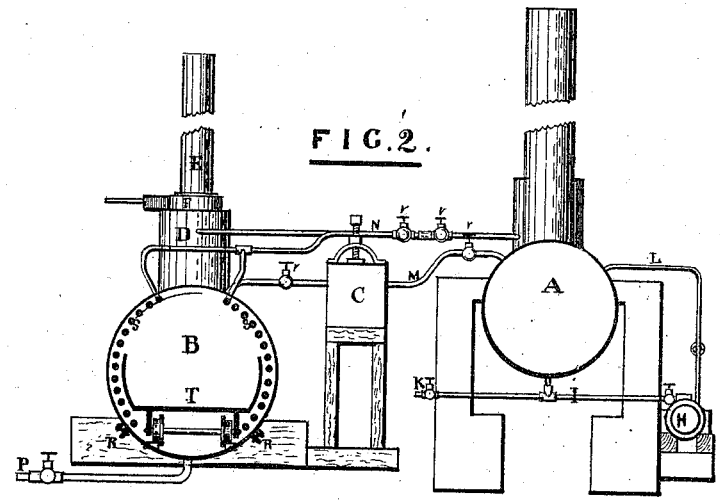
FIG. 2.
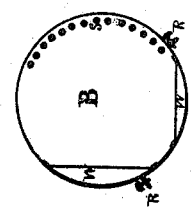
FIG. 3.
FIG. 1.
Witnesses
Rob't Thomas
William Gill
Inventor
John Oliver

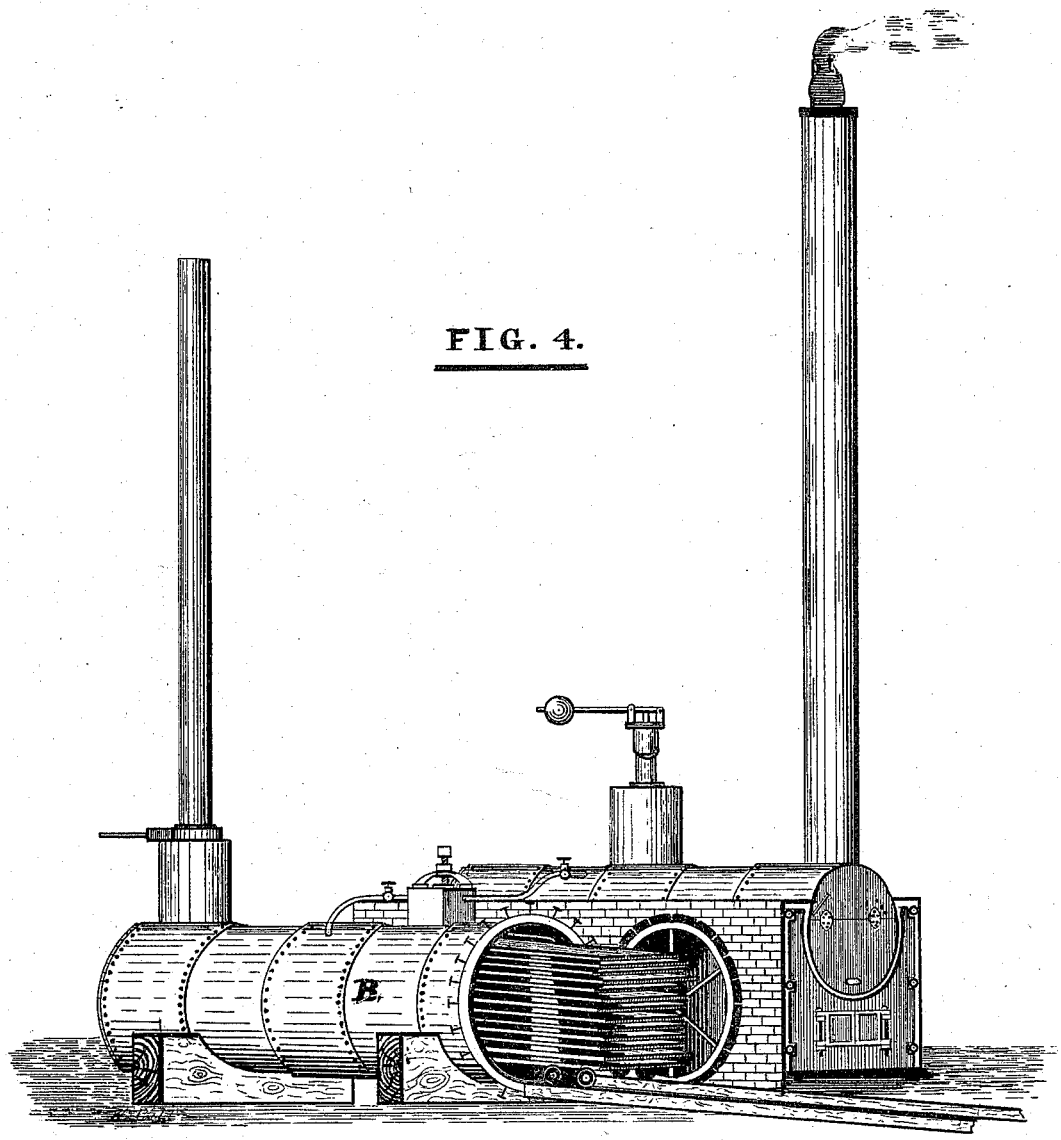

UNITED STATES PATENT OFFICE.

JOHN OLIVER, OF TORONTO, CANADA.

IMPROVEMENT IN PRESERVING AND DRYING LUMBER.

Specification forming part of Letters Patent No. 142,347, dated September 2, 1873; application filed May 21, 1873.

*To all whom it may concern:*

Be it known that I, JOHN OLIVER, of the city of Toronto, in the county of York, in the Province of Ontario, Canada, lumber-merchant, have invented new and useful Improvements in the Art of Preserving and Drying of Lumber; and I do hereby declare that the following is a full, clear, and exact description thereof, which will enable others skilled in the art to make and use the same, reference being had to the accompanying drawings forming a part of this specification.

This invention has for its object the preservation of lumber used in the construction of ships, steamboats, railroad-cars, buildings, and structures generally, and also for other purposes where durability is an especial object. It has also for its object the most expeditious and effective system of drying the lumber.

In the preservation of lumber various processes have been used—some of them in immersing the lumber in a tank containing an antiseptic solution; others by sprinkling powders of corrosive sublimate, arsenic, and common salt on the green lumber, piling and leaving it until fermentation takes place. The sap is not expelled from the lumber by this process, but becomes solidified by the fermentation caused by the aforesaid powders.

The first part of my invention consists in subjecting the lumber to a moderate pressure of steam impregnated with sulphate of zinc and alum—substances which I am not aware of ever having been used for this purpose—the astringent and antiseptic properties of which are well known. I allow two and a half pounds in weight of each substance to one thousand feet of one-inch pine lumber. The pressure of steam that I use is from thirty to forty pounds to the square inch, instead of high-pressure steam from sixty to one hundred pounds, which has been used in steaming purposes. I allow the action of this lower pressure and impregnated steam to continue for the space of fifteen minutes, or thereabout, for pine boards one inch thick; for boards of a greater thickness, for pine blocks, or for hard wood, a proportionately longer time is necessary. The second part of my invention relates to the drying of the lumber, and this immediately after it has been treated for preservation.

In other processes for drying lumber it is, after having been steamed under a pressure of from sixty to one hundred pounds to the square inch, exposed in the open air for thirty days, less or more. In frosty weather, from the moisture in the lumber freezing, the process during the winter months is impracticable. By my process I complete the drying of the lumber in the same tank which is used for the preserving process, and so closely upon the termination of that process as to become almost a part of the same operation. My invention, which includes both processes, can be carried on throughout the whole year.

Machinery suitable for carrying out the first part of my invention is shown in the accompanying drawings, in which drawings the same letters of reference indicate the same parts in all the views, and also in the specification.

Figure 1 is a plan; Fig. 2, a transverse section; Fig. 3, a transverse section of tank only. Fig. 4 is a perspective view of the process in operation.

A represents the steam-boiler; B, the preserving-tank; C, a vessel containing the sulphate of zinc and alum. G G are safety-valves, one of which is placed upon the boiler A, and the other one on the tank B. H is a donkey-engine and pump, for supplying the boiler A with feed-water; I, the feed-pipe; K, a blow-off valve, for blowing off mud and sediment from the steam-boiler A; L, a steam-pipe, with stop-valve for starting and stopping the donkey-engine. M is a steam-pipe from steam-boiler A to preserving-tank B, and forming a connection with the veessel C. T is truck, which runs upon a track, U U, inside the tank B, upon which truck the lumber is placed, in order to be operated upon when inside the tank B.

Having introduced the lumber into the tank B, and properly secured the same, and having also got up steam in the boiler A to the requisite pressure, as aforesaid, and having charged the vessel C with sulphate of zinc and alum in the proportions as aforesaid, I open the valves V V in steam-pipe M, thereby admitting steam from the boiler A through the pipe M into the vessel C, by which means the sulphate of zinc and alum therein are dissolved and evaporated, and conveyed into the tank B, impregnating the steam therein with the sulphate of zinc and alum. I allow this process to continue for about fifteen minutes, when the first part of my invention may be said to be completed.

In the accompanying drawings, the machinery necessary for the carrying out of the second part of my invention is also shown, which consists in the following additional portions thereof, viz: A steam-pipe, N, leading from the boiler A to two ranges of longitudinal steam-heating pipes conveniently distributed inside the tank B—these pipes are marked S S; a branch pipe, O, leading from tank to pipe N; two drip-taps, R R, for draining the pipes S S; a blow-off pipe, with valve P, in the bottom of the tank B; a steam-dome, D, on which is placed a stop-valve, F; and a draft-pipe, E.

The first part of my invention for the preservation of the lumber having been completed, I now close the valves V V in the steam-pipe M, thereby stopping the supply of impregnated steam to the tank B. I now open the blow-off valve P, and blow out any condensed steam and sediment there may be in the tank B. Closing again this valve P, I now open the valve V in steam-pipe O, by which means the longitudinal pipes S S inside the tank B are filled with waste steam from the tank. I now close this valve V in pipe O, and open the valve V in pipe N, thereby admitting live steam from the steam-boiler A to supplement that first admitted by the steam-pipe O. I now open the valve F, to allow the remainder of the steam and vapor yet in the tank B to escape through the draft-pipe E into the atmosphere. The live steam from the boiler A is now acting freely, through the steam-heating pipes S S, on the lumber inside the tank B, and the moisture arising therefrom escaping at the same time through the draft-pipe E. In the space of fifteen minutes, less or more, according to circumstances, the lumber in the tank B is found to be perfectly dry, and ready for use.

Returning to Fig. 4, B is the preserving-tank, constructed with steam-heating chambers W W, which are to be used either in combination with the longitudinal steam-heating pipes S S, or without them, as may be required.

I am aware that wood has been subjected to the action of steam as one step in the process of seasoning the same, and also for bending it into various shapes; but I am not aware that longitudinal steam-heating pipes have ever before been used in combination with a draft-pipe for drying lumber, as in my invention herein described; nor am I aware that longitudinal steam-heating pipes, as applied by me, were ever before used inside of a preserving-tank for the drying of lumber, either alone or in combination with a draft-pipe on the same tank.

I claim—

1. The subjecting of the lumber in a tank or vessel to the action of steam impregnated with sulphate of zinc and alum under a moderate pressure, in the manner specified and described, and for the purposes set forth.

2. The combination, with each other, of the longitudinal steam-heating pipes S S and draft-pipe E, as specified and described, and for the purpose set forth.

3. The combination, with each other, of the steam-chambers W W and steam-pipes S S inside the tank B, and draft-pipe E, the whole substantially as specified and described, and for the purposes set forth.

4. The combination, with the tank B, of the steam-chambers W W, substantially as and for the purpose set forth.

JOHN OLIVER.

Witnesses:
  ROBT. THOMAS,
  WILLIAM GILL.